Figure 1:
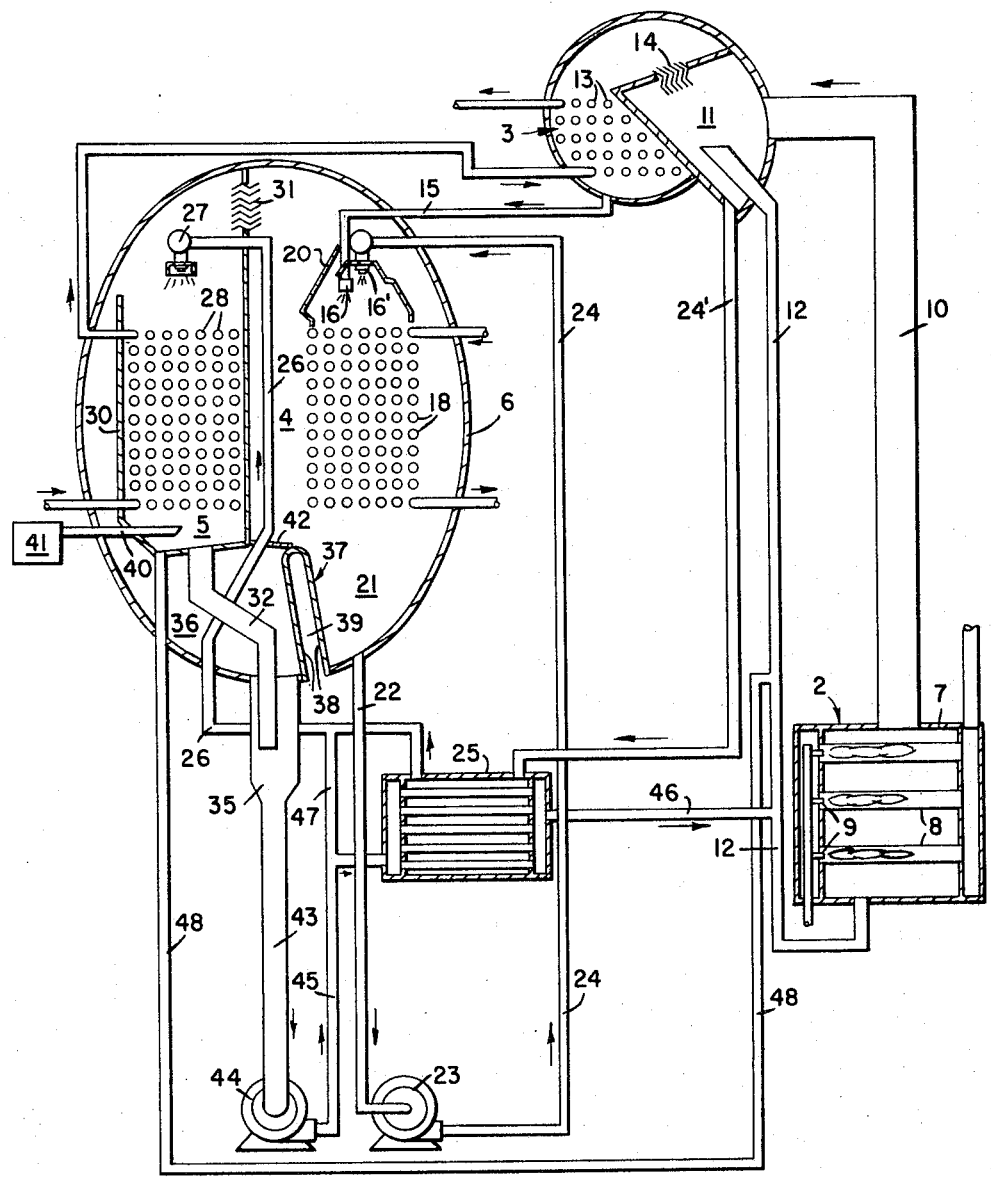

INVENTORS.
KEITH V. EISBERG.
JOSEPH R. BOURNE.

ATTORNEY.

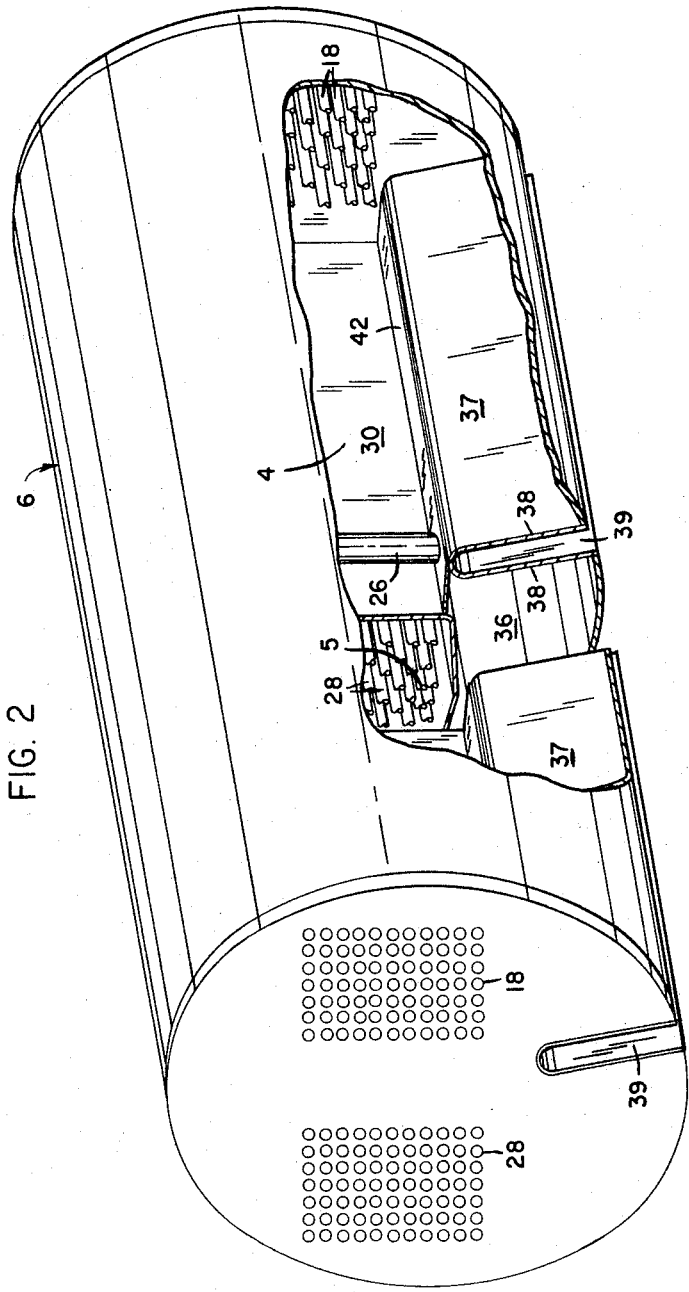

3,299,668
ABSORPTION REFRIGERATION SYSTEMS

Keith V. Eisberg, Syracuse, and Joseph R. Bourne, DeWitt, N.Y., assignors to Carrier Corporation, Syracuse, N.Y., a corporation of Delaware
Filed Apr. 1, 1965, Ser. No. 444,528
5 Claims. (Cl. 62—476)

This invention relates to absorption refrigeration systems and, more particularly, to an absorption refrigeration system including a shell construction for insulating sumps containing fluid at different temperatures from one another.

The chief object of the present invention is to provide an absorption refrigeration system of improved efficiency.

An object of the present invention is to provide an absorption refrigeration system in which the absorber and evaporator sumps are separated by an insulating space thus retarding heat exchange between the fluids at different temperatures present in such spaces.

A further object of the invention is to provide an absorption refrigeration system in which the absorber and evaporator are placed in side-by-side relation in a shell, a portion of the shell being formed to provide an air space which insulates the sumps from one another and retards or prevents heat exchange between fluids at different temperatures in such sumps. Other objects of the invention will be readily perceived from the following description.

This invention relates to an absorption refrigeration system comprising, in combination, a shell, a region in said shell adapted to contain a fluid at a substantially predetermined temperature, a second region in said shell adapted to contain a second fluid at a temperature different from the temperature of the first fluid, and means comprising spaced walls for forming an insulating space interposed between the first fluid and the second fluid, said walls serving to separate the fluids from one another and the space serving to insulate the fluids from one another thereby preventing substantial heat exchange between the fluids.

The attached drawings illustrate a preferred embodiment of the invention, in which FIGURE 1 is a diagrammatic view of the absorption refrigeration system of the present invention; and FIGURE 2 is an isometric view, partially broken away to disclose the shell construction of the present invention.

The absorption refrigeration system of the present invention preferably employs water as the refrigerant and a solution of lithium bromide as the absorbent solution although other refrigerants and absorbents may be employed. As used herein, the term "strong solution" refers to a concentrated solution of lithium bromide which is strong in absorbing power; the term "weak solution" refers to a dilute solution of lithium bromide which is weak in absorbing power.

Referring to the attached drawings, in FIGURE 1, there is shown an absorption refrigeration system including a generator section 2, a condenser section 3, an evaporator section 4 and an absorber section 5 interconnected to provide refrigeration. The evaporator and the absorber sections are placed within a horizontally extending, substantially cylindrical shell 6, as hereinafter described.

Generator section 2 comprises a shell 7 having a plurality of fire tubes 8 passing therethrough. Gas jets 9 supply an ignited mixture of gas and air into fire tubes 8 to heat weak solution which is supplied to the generator. A vapor lift tube 10 extends from the top of shell 7. Weak solution is heated in generator section 2 to boil off refrigerant vapor thereby concentrating the weak solution.

A mixture of concentrated absorbent solution and refrigerant bubbles rises upwardly through vapor lift tube 10 and passes into separator chamber 11. Equalizer line 12, connecting the bottom of generator 2 and separator 11, serves as an overflow under some conditions and assists in stabilizing the generator boiling.

Preferably, condenser section 3 is contained in the same shell as separator chamber 11 and comprises a plurality of heat exchange tubes 13. Any suitable cooling medium such as water passes through condenser tubes 13. Refrigerant vapor separates from the mixture of absorbent solution passed to separator chamber 11 and passes to condenser section 3 through eliminators 14. The refrigerant vapor is condensed to liquid refrigerant in condenser section 3 by the cooling medium passing through tubes 13. Liquid refrigerant passes from condenser section 3 through condensate line 15 to spray nozzles 16 in evaporator section 4.

Evaporator section 4 comprises a plurality of longitudinally extending heat exchange tubes 18 disposed in a tube bundle located in a region of shell 6. Water or other heat exchange fluid to be cooled is passed through tubes 18 in heat exchange relation with refrigerant supplied over exterior surfaces of the tubes. Heat is absorbed from the water to be cooled by the refrigerant thereby cooling the water in tubes 18 and vaporizing refrigerant on exterior surfaces of the tubes. The vaporized refrigerant passes from evaporator section 4 into absorber section 5 carrying with it the heat absorbed from the water passed through tubes 18. The chilled water may be circulated to a place of use as desired. Baffles 20 are provided to direct refrigerant vapor from the spray nozzles 16 toward the tube bundle in the evaporator section.

Shell 6 includes an evaporator sump 21 to receive unevaporated liquid refrigerant which drips off the lower rows of tubes 18. A refrigerant recirculation line 22 receives refrigerant from sump 21, the refrigerant being pumped by pump 23 through line 24 to nozzles 16' where it is again discharged over the top of the tube bundle in the evaporator section.

Strong solution is passed from the lower portion of separator chamber 11 through strong solution line 24', through heat exchanger 25 in which it is placed in heat exchange relation with weak solution passing to the generator, the strong solution flowing from heat exchanger 25 through line 26 to spray nozzles 27 in the absorber, and is distributed by spray nozzles 27 over longitudinally extending tubes 28 to wet the absorber tubes. Absorber section 5 is contained in shell 6.

Cooling water or other suitable cooling medium is passed through tubes 28 to cool the absorbent solution sprayed on their exterior surfaces. An absorber pan 30 is arranged around the sides and bottom of the tube bundle in the absorber section. Eliminators 31 may be provided if desired in the vapor path between the absorber and the evaporator section.

An absorber discharge conduit 32 collects and discharges the solution into outlet 35 of solution storage sump 36 which is formed in the lower portion of the absorber shell 6.

Liquid refrigerant in sump 21 and weak solution in absorber sump 36 are at different temperatures. Sumps 21, 36 must be separated to prevent liquid refrigerant in sump 21 mixing with the weak solution in sump 36 and vice versa.

Since the liquids are at different temperatures, it is desirable to insulate the two sumps from one another to prevent substantial heat exchange between the fluids. For this purpose a baffle 37 is provided. Baffle 37 extends longitudinally of cylindrical shell 6 separating sumps 21, 36. Baffle 37, preferably, constitutes a part of shell 6 and is integrally attached thereto. Baffle 37 when considered in cross-section is in the form of a hairpin, its legs 38 being spaced apart and providing an air space 39 therebetween, the air space 39 serving to insulate solution in sump 36 from liquid refrigerant in sump 21 thereby preventing substantial heat exchange between the solution and the refrigerant.

A purge line 40 may be provided adjacent the lower portion of the tube bundle in absorber section 5 and is connected to a suitable purge unit 41. If desired, a baffle 42 may be provided between absorber pan 30 and evaporator section 4 to prevent unwanted refrigerant draining into the absorber section.

Absorbent solution is withdrawn from the absorber section through weak solution line 43 connected to outlet 35 of the absorber and is forwarded by pump 44 through line 45, heat exchanger 25 and line 46 to equalizer line 12 where it is forwarded to the generator section for reconcentration. If desired, a portion of the weak solution discharged by pump 44 may be passed through weak solution recirculating line 47 to mix with concentrated absorbent solution in line 26 and recirculate through spray nozzles 27.

Preferably, a solution line 48 is provided between equalizer line 12 and the lower portion of absorber pan 30. Line 48 maintains the proper solution level in generator section 2 when the machine is placed in operation.

It will be appreciated that in absorption refrigeration systems in which the condenser and generator are placed in a single shell it may be desirable to provide an air space between the condenser sump and the generator sump to insulate fluids at different temperatures from one another and such construction is within the scope of the present invention. Similarly, such construction may be employed to separate the condenser and the separator chamber if they are included in the same shell.

In some constructions, it may be desirable to place the baffle separating the absorber and the evaporator sumps from each other within the shell. This is generally not as acceptable a construction because it is possible the air space between the legs of the baffle within the shell may become heated. In some cases, such air space may be connected to the purge line of the system thus maintaining the air space between the legs of the baffle at a lower pressure to increase its insulating value.

The present invention provides an evaporator-absorber shell construction for an absorption refrigeration system which enhances the efficiency of the system by assuring that fluids in the evaporator and absorber at different temperatures are insulated from one another. The air space provided by the present invention to insulate the evaporator and absorber from each other is exposed to the ambient and thus remains essentially at ambient temperature. The construction herein provided is adapted for more simple manufacture at lower costs and permits ready detection of liquid leakage if such exists.

While we have described a preferred embodiment of the invention, it will be appreciated the invention is not limited thereto since it may be otherwise embodied within the scope of the following claims.

We claim:
1. In an absorption refrigeration system, the combination of a unitary shell, a fluid evaporating region in said shell adapted to contain fluid at a substantially predetermined temperature, a second region in said shell adapted to contain a second fluid at a temperature different from the temperature of the first fluid, the second region being open to the first region to permit evaporated fluid to flow from the first region to the second region, and means constituting a part of the shell forming an air space open to the ambient and sealed from said regions, those portions of the shell forming the air space being spaced from one another and separating the fluids from one another, the air space preventing substantial heat exchange between the fluids.

2. An absorption refrigeration system according to claim 1 in which the means forming the air space constitute in cross-section a baffle in the form of a hairpin, the legs of the baffle forming the air space and separating the fluids from one another, the legs of the baffle being integrally attached to the shell.

3. In an absorption refrigeration system, the combination of a horizontally extending, substantially cylindrical, unitary shell, a fluid evaporating region in said shell adapted to contain a fluid at a substantially predetermined temperature, a second region in said shell adapted to contain a second fluid at a temperature different from the temperature of the first fluid, the second region being open to the first region to permit evaporated fluid to flow from the first region to the second region, a baffle in said shell separating said regions, said baffle extending longitudinally of the shell and having in cross-section the form of a hairpin, the legs of the baffle forming an air space open to the ambient and separating the regions to separate the fluids from one another, the legs of the baffle being integrally attached to the shell, the air space formed by the legs of the baffle serving as insulation to insulate the fluids from one another thereby preventing substantial heat exchange between the fluids.

4. In an absorption refrigeration system, the combination of a horizontally extending, substantially cylindrical shell, a plurality of tubes extending longitudinally of said shell comprising an absorber, cooling medium passing through the tubes being placed in heat exchange relation with solution passing over the tubes, a sump below said tubes to receive solution, said sump extending longitudinally of the shell; an evaporator in said shell comprising a plurality of tubes extending longitudinally of the shell and placed in substantially side-by-side relation with the tubes forming the absorber, refrigerant passing over the evaporator tubes passing in heat exchange with the medium to be cooled passing through the tubes, a second sump below the evaporator tubes to receive refrigerant from the tubes, said second sump being placed in substantially side-by-side relation longitudinally of the shell to the first sump; and means constituting a part of the shell extending longitudinally thereof forming an air space open to the ambient and sealed from the absorber and the evaporator, those portions of the shell forming the air space being spaced from one another to separate the sumps, the air space serving to insulate solution in the first sump from refrigerant in the second sump thereby preventing substantial heat exchange between the solution and the refrigerant.

5. An absorption refrigeration system according to claim 4 in which the means forming the air space constitute in cross-section a baffle in the form of a hairpin, the baffle extending longitudinally of the shell, the legs of the baffle forming the air space separating the sumps, the space between the legs constituting the insulating space, the legs of the baffle being integrally attached to the shell.

References Cited by the Examiner
UNITED STATES PATENTS

| | | | |
|---|---|---|---|
| 2,320,349 | 6/1943 | Cropper | 62—476 X |
| 3,124,938 | 3/1964 | Leonard | 62—494 X |
| 3,154,930 | 11/1964 | Aronson | 62—489 X |
| 3,195,323 | 7/1965 | Swearingen | 62—476 X |

LLOYD L. KING, *Primary Examiner.*